United States Patent
Velev et al.

(10) Patent No.: US 11,553,330 B2
(45) Date of Patent: Jan. 10, 2023

(54) RADIO CAPABILITY CHANGE

(71) Applicant: Lenovo (Singapore) PTE. LTD., New Tech Park (SG)

(72) Inventors: Genadi Velev, Darmstadt (DE); Prateek Basu Mallick, Dreieich (DE); Joachim Loehr, Wiesbaden (DE); Ravi Kuchibhotla, Clarendon Hills, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 16/417,155

(22) Filed: May 20, 2019

(65) Prior Publication Data

US 2019/0357037 A1 Nov. 21, 2019

Related U.S. Application Data

(60) Provisional application No. 62/673,790, filed on May 18, 2018.

(51) Int. Cl.
*H04W 8/24* (2009.01)
*H04W 76/25* (2018.01)
(Continued)

(52) U.S. Cl.
CPC .............. *H04W 8/24* (2013.01); *H04W 8/04* (2013.01); *H04W 8/08* (2013.01);
(Continued)

(58) Field of Classification Search
CPC ........... H04W 8/24; H04W 8/04; H04W 8/08; H04W 76/25; H04W 76/27;
(Continued)

(56) References Cited

U.S. PATENT DOCUMENTS

2012/0040687 A1* 2/2012 Siomina .................. H04W 8/24
455/456.1
2013/0322302 A1* 12/2013 Gholmieh ......... H04W 36/0055
370/280
(Continued)

FOREIGN PATENT DOCUMENTS

WO  2013/091665 A1  6/2013

OTHER PUBLICATIONS

ETSI, LTE; General Packet Radio Service (GPRS) enhancements for Evolved Universal Terrestrial Radio Access Network (E-UTRAN) access 93GPP TS 23.401 version 14.3.0 Release 14), ETSI TS 123 401 V14.3.0, May 2017, pp. 1-393.
(Continued)

*Primary Examiner* — Ricardo H Castaneyra
(74) *Attorney, Agent, or Firm* — Kunzler Bean & Adamson

(57) ABSTRACT

Apparatuses, methods, and systems are disclosed for modifying a radio capability. One apparatus includes a processor and a transceiver that communicates with a RAN node. The processor registers with a first communication system via the RAN node. The processor detects a trigger to perform radio capability change for at least one radio access technology ("RAT") and transitions the apparatus to an idle state. The processor further sends a request to the first communication system to update one or more UE radio capabilities while in the idle state.

21 Claims, 7 Drawing Sheets

(51) Int. Cl.
   *H04W 76/27*  (2018.01)
   *H04W 8/04*   (2009.01)
   *H04W 8/08*   (2009.01)
   *H04W 36/00*  (2009.01)
   *H04W 60/00*  (2009.01)
   *H04W 84/04*  (2009.01)

(52) U.S. Cl.
   CPC ....... *H04W 36/0022* (2013.01); *H04W 60/00* (2013.01); *H04W 76/25* (2018.02); *H04W 76/27* (2018.02); *H04W 84/042* (2013.01)

(58) Field of Classification Search
   CPC . H04W 36/0022; H04W 60/00; H04W 60/04; H04W 84/042; H04W 76/10; H04W 36/14; H04W 88/06; H04W 48/18
   See application file for complete search history.

(56) References Cited

U.S. PATENT DOCUMENTS

| | | | |
|---|---|---|---|
| 2017/0238188 A1* | 8/2017 | Youtz | H04W 16/14 455/454 |
| 2019/0150219 A1* | 5/2019 | Wang | H04W 76/30 370/329 |
| 2020/0145953 A1* | 5/2020 | Youn | H04W 36/0027 |
| 2021/0029618 A1* | 1/2021 | Jain | H04W 48/16 |

OTHER PUBLICATIONS

RAN2, "LS to SA2 and CT1 on enabling and disabling NG RAN Capabilities", 3GPP TSG-RAN WG2 Meeting #101 R2-1804094, Feb. 26-Mar. 2, 2018, p. 1.
3GPP, "3rd Generation Partnership Project; Technical Specification Group Services and System Aspects; Procedures for the 5G System; Stage 2 (Release 15)", 3GPP TS 23.502 V15.1.0, Mar. 2018, pp. 1-285.
3GPP, "3rd Generation Partnership Project; Technical Specification Group Services and System Aspects; System Architecture for the 5G System; Stage 2 (Release 15)", 3GPP TS 23.501 V15.1.0, Mar. 2018, pp. 1-201.
Qualcomm Incorporated, "Alignment of radio capabilities procedure", 3GPP TSG-SA WG2 Meeting #127bis S2-186164, May 28-Jun. 1, 2018, pp. 1-2.
Intel, et al., "Dual Registration mode of operation from E-UTRA cell connecting to both EPC and 5GC", SA WG2 Meeting #127 S2-184621, Apr. 16-20, 2018, pp. 1-3.
PCT/IB2019/000616, "Notification of Transmittal of the International Search Report and the Written Opinion of the International Searching Authority, or the Declaration" PCT, Oct. 21, 2019, pp. 1-20.
Motorola Mobility et al., "Service fallback in DR-mode of operation", SA WG2 Meeting #124 S2-178893, Nov. 27-Dec. 1, 2017, pp. 1-3.
Motorola Mobility, Lenovo, "UE radio capability handling in the 5GS", SA WG2 Meeting #S2-127BIS S2-185361, May 28-Jun. 1, 2018, pp. 1-3.

\* cited by examiner

RADIO CAPABILITY CHANGE

CROSS-REFERENCE TO RELATED APPLICATIONS

This application claims priority to U.S. Provisional Patent Application No. 62/673,790 entitled "RADIO CAPABILITY MODIFICATION FOR DUAL REGISTRATION TERMINALS" and filed on May 18, 2018 for Genadi Velev, Prateek Basu Mallick, Joachim Loehr, and Ravi Kuchibhotla, which is incorporated herein by reference.

FIELD

The subject matter disclosed herein relates generally to wireless communications and more particularly relates to radio capability change.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Bandwidth Part ("BWP"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Licensed Assisted Access ("eLAA"), Enhanced Mobile Broadband ("eMBB"), Evolved Node B ("eNB"), European Telecommunications Standards Institute ("ET SI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Remaining Minimum System Information ("RMSI"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINK"), System Information Block ("SIB"), Synchronization Signal ("SS"), Supplementary Uplink ("SUL"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, an EPC and a 5GC may be deployed without an N26 interface. The N26 interface supports EPS/5GS interworking, thus a UE may simultaneously register with EPS and 5GS, referred to as Dual Registration (DR) mode for interworking between EPS/E-UTRAN and 5GS/NR. However, when a UE operating in DR mode goes out of 5GS/NR coverage and enters an E-UTRA cell providing access to both EPC and 5GC, continuing DR mode would undesirably result in the UE: A) using the same cell to connect to two different CNs and B) having two RRC connections to the same eNB, whereas the one RRC connection is for EPC and the other one to 5GC.

BRIEF SUMMARY

Methods are disclosed for modifying a radio capability. Apparatuses and systems also perform the functions of the methods. The methods may also be embodied in one or more computer program products comprising executable code.

A method for modifying a radio capability includes registering with a first communication system via a radio access network ("RAN") node and detecting a trigger to perform radio capability change for at least one radio access technology ("RAT"). The method includes transitioning the UE state to an idle state and sending a request to the network to update one or more UE radio capabilities while in the idle state.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
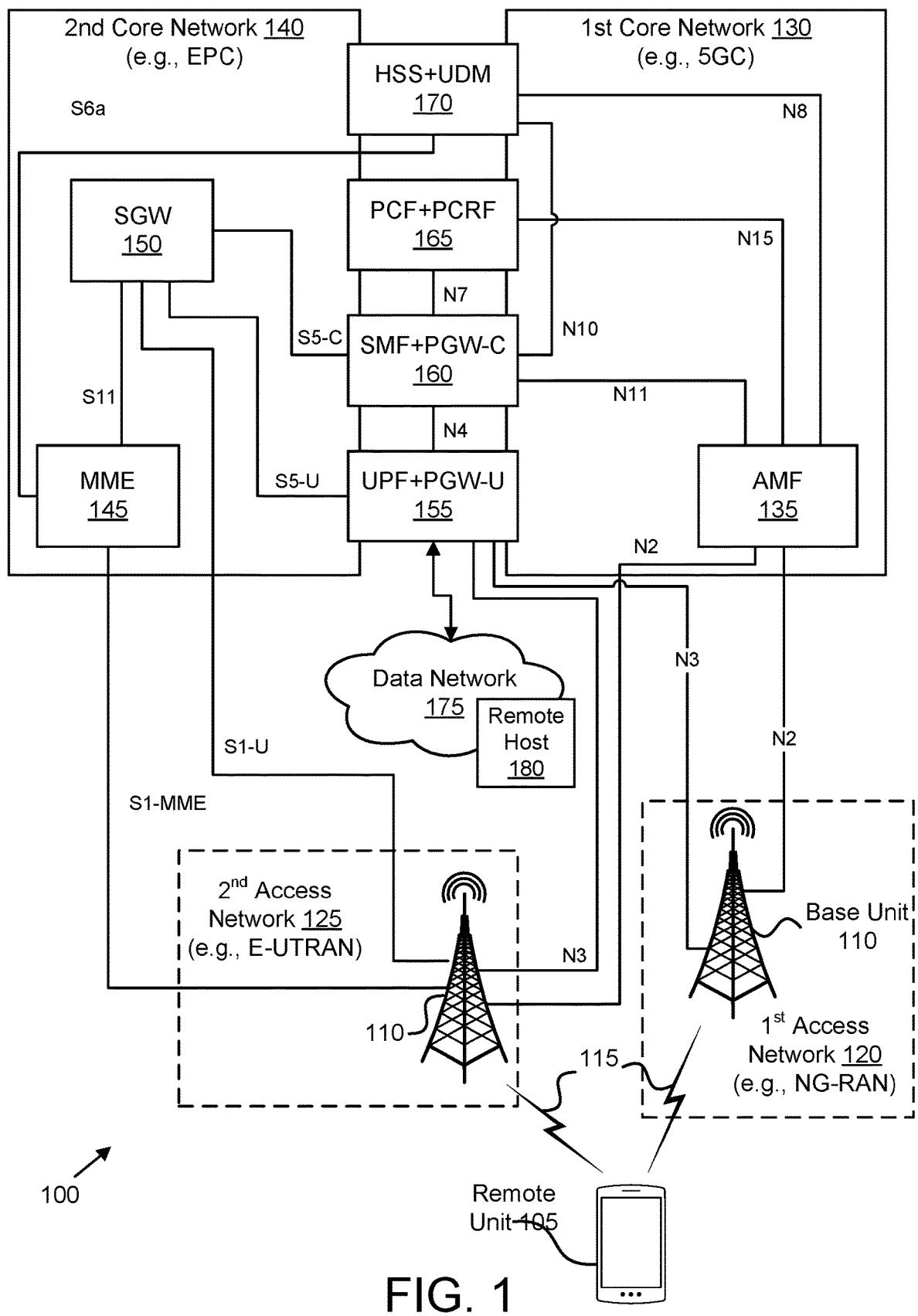
FIG. 1 is a schematic block diagram illustrating one embodiment of a wireless communication system for modifying a radio capability.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for modifying a radio capability. In various embodiments, a UE may operate in a Dual Registration ("DR") mode having simultaneous registrations with EPS and 5GS. In some embodiments, the DR mode is used only in networks which do not support interworking via N26 interface.

In a given PLMN, the AMF (in the 5GC) and MME (in the EPC) provide an indication to UEs that EPS-5GS interworking without N26 is supported. This indication may be provided during Initial Registration (in 5GC) or during the Attach procedure (in EPC). Moreover, this indication is valid for the entire Registered PLMN and for PLMNs equivalent to the Registered PLMN. Additionally, the same indication is provided to all UEs served by the same PLMN.

Accordingly, UEs that operate in a PLMN that supports EPS-5GS interworking without N26 (e.g., operable in DR mode) may use this indication to decide whether to register early in the target system. Note that the network does not provide mapped QoS parameters to a UE in DR mode, i.e., if interworking with N26 is not supported.

In various embodiments, the UE provides the following indications to the core network (e.g., AMF or MME) during Initial Attach to EPC or during Registration to 5GC:

In some embodiments, the UE indicates its support of EPC NAS during the registration procedure with the AMF or its support of 5GC NAS during the attach procedure with the MME. For example, the UE may provide the indication using the "UE Network Capability" parameter. This indication might be used by the AMF/MME to select combo PGW-C+SMF node for EPS-5GS interworking.

Additionally, the UE may indicate that it supports Request Type flag "handover" for PDN connectivity request during the attach procedure in EPC and during initial registration and mobility Registration Update in 5GC. Note that this indication may be used for IP address preservation in the case of interworking without N26.

For interworking without N26, the UE needs to indicate that it is moving from 5GC (or from EPC) so that the MME or AMF does not include "initial attach" indicator to the HSS+UDM. Because the "initial attach" indicator is not included, the HSS+UDM does not cancel the earlier registration of AMF or MME.

FIG. 1 depicts a wireless communication system 100 for suspending services in a first core network while attached to a second core network, according to embodiments of the disclosure. In one embodiment, the wireless communication system 100 includes at least one remote unit 105, a first access network 120 containing at least one base unit 110, a second access network 125 containing at least one base unit 110, wireless communication links 115 between remote unit 105 and base unit 110, a first core network 130, and a second core network 140. Even though a specific number of remote units 105, access networks 120, 125, base units 110, wireless communication links 115, and core networks 130, 140 are depicted in FIG. 1, one of skill in the art will recognize that any number of remote units 105, access networks 120, 125, base units 110, wireless communication links 115, and core networks 130, 140 may be included in the wireless communication system 100. In various embodiments, the access networks 120, 125 may contain one or more WLAN (e.g., Wi-Fi™) access points ("APs"). Here, the first access network 120, second access network 125, first core network 130 and second core network 140 belong to the same mobile communication network (e.g., the same PLMN).

In one implementation, the wireless communication system 100 is compliant with the 5G system and the LTE system specified in the 3GPP specifications. More generally, however, the wireless communication system 100 may implement some other open or proprietary communication network, for example, WiMAX, among other networks. The present disclosure is not intended to be limited to the implementation of any particular wireless communication system architectures or protocols.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UEs, user terminals, a device, or by other terminology used in the art. The remote units 105 may communicate directly with one or more of the base units 110 via uplink ("UL") and downlink ("DL") communication signals. Furthermore, the UL and DL communication signals may be carried over the wireless communication links 115.

In some embodiments, the remote units 105 communicate with a remote host 180 (for example, an application server) via a data path that passes through one of the core networks 130, 140 and through the data network 175. For example, a remote unit 105 may establish a PDU session (or similar data connection) to the data network 175 via the first core network 130. The first core network 130 then relays traffic between the remote unit 105 and the remote host 180 using the PDU session. As another example, a remote unit 105 may establish a PDN connection to the data network 175 via the second core network 140. The second core network 140 then relays traffic between the remote unit 105 and the remote host 180 using the PDN connection.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the first access network 120 (e.g., NG-RAN) and/or the second access network 125 (e.g., E-UTRAN), that may include one or more controllers communicably coupled to one or more corresponding base units 110. These and other elements of the radio access network are not illustrated, but are well known generally by those having ordinary skill in the art.

The base units 110 may serve a number of remote units 105 within a serving area, for example, a cell or a cell sector via a wireless communication link 115. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

As depicted, the wireless communication system 100 includes both a first core network 130 and a second core network 140 and various interworking network functions for to support interworking between the user plane and certain control plane functions in the first core network 130 and the second core network 140. The first core network 130 includes an Access and Mobility Management Function ("AMF") 135 that is not shared with the second core network 140. Similarly, the second core network 140 includes a Mobility Management Entity ("MME") 145 and a Serving Gateway ("SGW") 150 that are note shared with the first core network 130. However, there is a combined UPF and PGW-user-plane ("UPF+PGW-U") 155, a combined SMF and PGW-control-plane ("SMF+PGW-C") 160, a combined PCF and PCRF ("PCF+PCRF") 165, and a combined HSS and UDM ("HSS+UDM") that support interworking between the first core network 130 and second core network 140. Note that the notions "SMF+PGW-C" and "UPF+PGW-U" are used to show that the network functions used for, e.g., PDU Sessions in 5GC and PDN Connections in EPC are common, in case that IP session continuity is required during transfer of PDU Sessions to PDN Connections and vice-versa. Although specific numbers and types of network functions are depicted in FIG. 1, one of skill in the art will recognize that any number and type of network functions may be included in the mobile core networks 130 and/or 140.

As depicted, the wireless communication system 100 includes various network interfaces that facilitate communication among the core network ("CN") elements. For example, a base unit 110 (or RAN) may communicate with the AMF 135 via the N2 interface and with the UPF+PGW-U 155 via the N3 interface. As another example, a base unit 110 may communicate with the MME 145 via the S1-MME interface and with the SGW via the S1-U interface. Other network interfaces are depicted, including, but not limited to, a N4 interface between the UPF+PGW-U 155 and the SMF+PGW-C 160, a N7 interface between the SMF+PGW-C 160 and the PCF+PCRF 165, a N8 interface between the AMF 135 and the HSS+UDM 170, a N10 interface between the SMF+PGW-C 160 and the HSS+UDM 170, a N11 interface between the AMF 135 and the SMF+PGW-C 160, a N15 interface between the AMF 135 and the PCF+PCRF 165, a S5-U interface between the SGW 150 and the UPF+PGW-U 155, a S5-C interface between the SGW 150 and the SMF+PGW-C 160, a S6a interface between the MME 145 and the HSS+UDM 170, and the S11 interface between the MME 145 and the SGW 150.

Although not depicted, the wireless communication system 100 may support a N1 interface between the remote unit 105 and the AMF 135. Note, however, that there is no network interface between the AMF 135 and the MME 145 (i.e., no N26 interface). This is because the AMF 135 and the MME 145 are not communicatively coupled. Accordingly, inter-system handover from the 5GC to EPC (or vice versa) is not supported.

In various embodiments, the remote unit 105 may register with a first communication system and indicate (e.g., announce) one or more radio capabilities to the first communication system. Here, the radio capabilities relate to RAT. The remote unit 105 later determines to register with a second communication system and updates the one or more UE radio capabilities using a Non-Access Stratum ("NAS") procedure. Here, the first and second communication systems may belong to the same PLMN. In one embodiment, the first communication system includes an EPC and wherein the second communication system comprises a 5GC.

In certain embodiments, the remote unit 105 may perform a radio capability exchange towards a base unit 110 (e.g., a RAN node). Here, the remote unit 105 updates one or more RAT capabilities of the second communication system during the radio capability exchange.

If the remote unit 105's NG-RAN UE Radio Capability information changes while in CM-IDLE state, the remote unit 105 performs the Registration procedure with the Registration type set to Mobility Registration Update indicating "UE Radio Capability Update". When the AMF receives Registration Update Request with "UE Radio Capability Update", it shall delete any UE Radio Capability information that it has stored for the remote unit 105.

If the trigger to change the remote unit 105's NG-RAN UE Radio Capability information happens when the UE is in CM-CONNECTED state, the remote unit 105 first enters CM-IDLE state and then perform the Registration procedure with the Registration type set to Mobility Registration Update indicating "UE Radio Capability Update".

To update the one or more UE radio capabilities, the remote unit 105 transitions to a UE idle state, such as the CM-IDLE state. Note that the transition of the "UE state" is in both the remote unit 105 and in the network. As described in further detail herein, the transition may be based on explicit signaling. Alternatively, this may be an implicit transition without signaling. and (within the remote unit 105) a NAS entity (e.g., in the NAS layer) instructs an Access Stratum ("AS") entity (e.g., in the AS layer) to modify an AS layer capability. In one embodiment, modifying the AS layer capability comprises disabling a radio capability for a particular radio access technology. In another embodiment, modifying the AS layer capability comprises enabling a radio capability for a particular radio access technology. In certain embodiments, when entering the CM Idle state, the remote unit 105 may deactivate a radio resource control ("RRC") idle state, e.g., using NAS signaling and/or RRC signaling. This is an instruction from the NAS layer to the AS layer to transition to RRC idle state. As such, the NAS entity in the remote unit 105 may instruct the AS entity to discard (or deactivate) the existing AS context and to modify an AS layer capability for the remote unit 105.

In some embodiments, the remote unit 105 updates the one or more UE radio capabilities by having a NAS layer entity initiate a NAS update procedure. One suitable NAS update is the EPS NAS tracking area update procedure. Alternatively, the remote unit 105 may initiate the NAS update procedure by sending a 5GS NAS registration request for mobility update.

In other embodiments, a remote unit 105 may register with a first communication system via a radio access network ("RAN") node, announce radio capabilities for at least one RAT to the first communication system, and detect a need to change an AS capability of the UE. In response, the remote unit 105 may send a request to the network that a particular AS capability be deprecated or disclaimed. Here, the request may be via NAS signaling or RRC signaling. Upon receiving the indication of a deprecated/disclaimed capability (e.g., AS capability), the RAN node (e.g., base unit 110) does not consider the deprecated AS capability (e.g., considers the remote unit 105 to not have the particular AS capability).

In certain embodiments, requesting that a particular AS capability be deprecated (disclaimed) includes the remote unit 105 indicating that a previously indicated (claimed) RAT capability is deprecated (disclaimed). In certain embodiments, the request that a particular AS capability be deprecated includes an indication that the network does not need to update the UE radio capability. In response to the depreciation indication (disclaiming a RAT capability), the base unit 110 (e.g., RAN node) no longer considers the deprecated capability (e.g., considers the remote unit 105 to not have the previously indicated RAT capability).

In one embodiment, detecting the need to change the AS capability of the UE comprises determining to register with a second communication system. In other embodiments, other trigger events may require the change in AS capability. Additionally, the remote unit 105 may later send a request to the network to abolish the deprecated AS capability.

Figure 2:
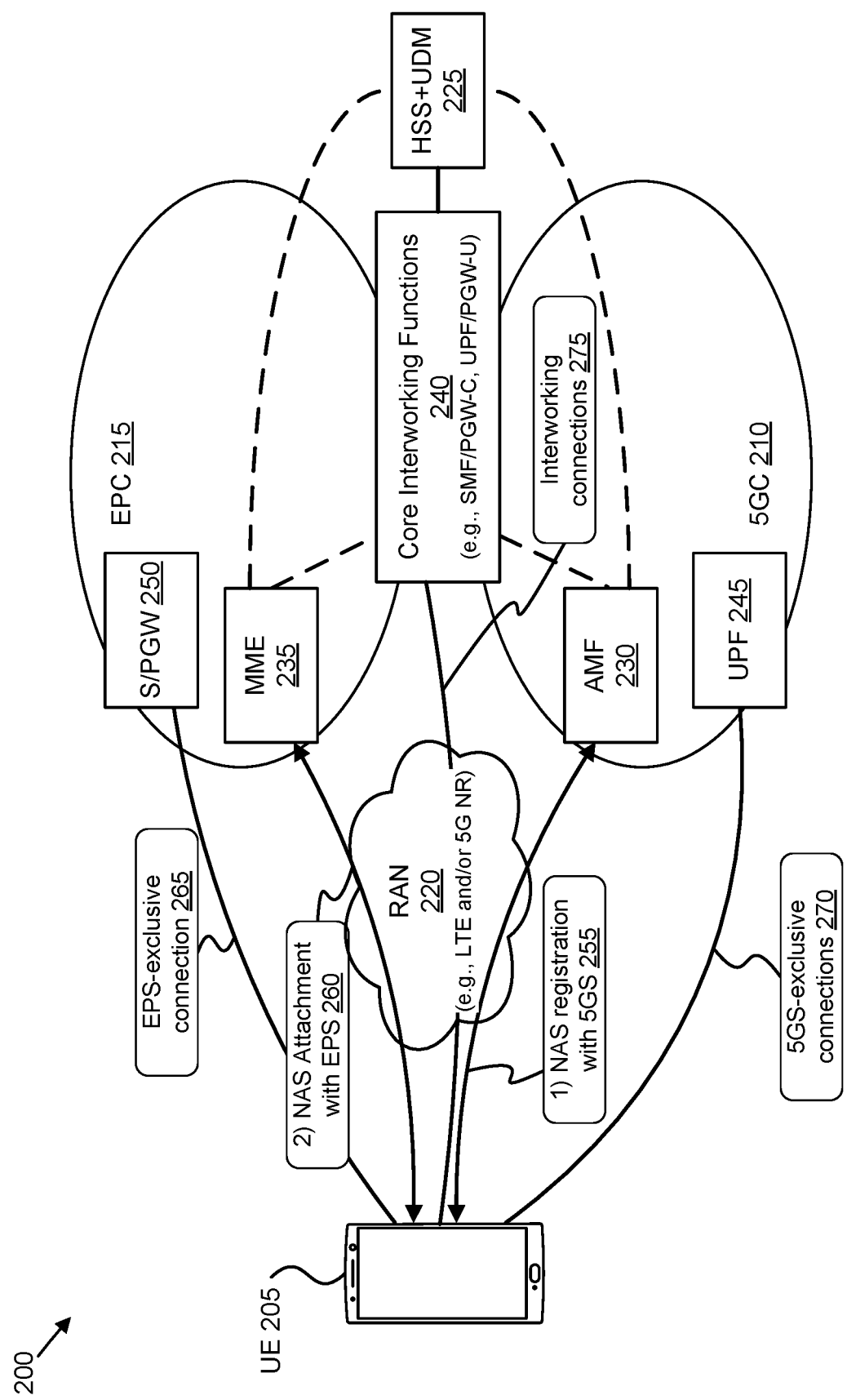
FIG. 2 is a block diagram illustrating one embodiment of a network architecture for modifying a radio capability.

FIG. 2 depicts a network architecture 200 used for suspending services in a first core network while attached to a second core network, according to embodiments of the disclosure. The network architecture 200 may be a simplified embodiment of the wireless communication system 100. As depicted, the network architecture 200 includes a UE 205 that communicates with a 5GC 210 and with an EPC 215 via a RAN 220. The UE 205 may be one embodiment of the remote unit 105, the 5GC 210 may be an embodiment of the first core network 130, and the EPC 215 may be an embodiment of the second core network 140. Additionally, the network architecture 200 includes multiple core interworking functions 240, such as a SMF/PGW-C interworking function, a UPF/PGW-U interworking functions, etc. Although shared by the 5GC 210 and the EPC 215, the HSS+UDM is depicted as separate from the core interworking functions 240.

In the depicted embodiment, the 5GC 210 and EPC 215 belong to the same PLMN. In various embodiments, the RAN 220 broadcasts an indication in the system information (e.g., SIB) that the PLMN supports DR-mode. Here, the UE 205 is configured to operate in DR-mode.

FIG. 2 shows an example of how a UE 205 may operate in DR mode, i.e., registered to EPS and 5GC simultaneously. The UE 205 may establish PDN Connections in EPS and PDU sessions in 5GS. However, some PDN connection in EPS may not support interworking with 5GS, for example EPS-exclusive connections 265 having the S/PGW 250 as the anchor point in the user plane. Accordingly, such a PDN connection cannot be transferred to 5GS. Similarly, some PDU Sessions in 5GS may not support interworking with EPS, for example 5GS-exclusive connections 270 having the UPF 245 as the anchor point in the user plane. Accordingly, such a PDU session cannot be transferred to EPS. Yet another type of PDN connections or PDU session can support interworking between EPS and 5GS, depicted as interworking connections 275, because the anchor point in the control plane (e.g., SMF+PGW-C) for the PDN connection or PDU session is a common entity (e.g., one of the core interworking functions 240) and the anchor point in the user plane (e.g., UPF+PGW-U) is also a common entity.

A UE 205 is expected to be able to enable (and disable) capabilities to access 5GS (e.g., 5GC 210). However, at the time of invention there is no access stratum procedure available to accomplish a change of UE capabilities. Thus, the UE 205 may rely on upper layer (e.g., NAS) procedures to accomplish such a change. One example of a NAS procedure is the Detach/Re-attach procedure. Note that the UE 205 NAS capability is used in the mobility management entity (e.g., MME 235 or AMF 230) to select a combined PGW-C+SMF entity (e.g., core interworking function 240) in case of the UE 205 supporting both 5GC NAS and EPC NAS. The UE 205 NAS capability is distinct from the UE 205 radio capability; thus, it should be differentiated between UE 205 NAS capability announcement and the UE 205 radio capability announcement.

DR mode is intended for interworking between EPS/E-UTRAN and 5GS/NR. A problem occurs when a UE 205 operating in DR mode goes out of 5GS/NR coverage and enters an E-UTRA cell providing access to both EPC 215 and 5GC 210. The UE 205 would end-up in 1) using the same cell to connect to two different CNs (e.g., EPC 215 and 5GC 210) and 2) having two RRC connections to the same eNB, whereas the one RRC connection is for EPC 215 and the other one to 5GC 210.

In order to avoid such scenario, the UE 205 operating in DR mode is not to send its E-UTRA capability to NG-RAN when connected to 5GS/NR to avoid being handed over to 5GC-connected E-UTRA (e.g., RAN 220). This prevents the UE 205 from being connected to E-UTRAN/EPC 215 and E-UTRA/5GC 210 simultaneously using separate RRC connections via a single RAN node (in the RAN 220) as a result of handover. However, 3GPP Release 15 ("Rel-15") leaves unclear which capability the UE 205 is to announce when attaching to the EPS/E-UTRAN. Additionally, it is unclear whether the UE 205 is to send to the CN its NAS capabilities (5GC NAS and/or EPC NAS capabilities) when disabling/enabling in the AS layer a particular RAT radio capability. Accordingly, current standards do not specify whether the UE 205 sends its NR capability to the EPS/E-UTRAN when operating in DR mode.

In various embodiments, the UE 205 operating in DR mode is not to send its E-UTRA capability to NG-RAN when connected to 5GS/NR in order to avoid being handed over to 5GC-connected E-UTRA. However, Rel-15 does not provide details about the UE 205 behavior while attached/registered to the EPS. In order to avoid the configuration on Dual Connectivity ("DC") with NR when the UE 205 is connected to E-UTRA/EPS and the simultaneous use of RRC connection in NR/5GC, in one embodiment, the UE 205 does not send its NR capability to E-UTRA when connected to EPS/E-UTRA to avoid being configured in EN-DC mode while also using NR for accessing 5GS/NR.

If the UE 205 has been operating in DR mode and the UE 205 deregisters from one system, e.g., the UE 205 deregisters from the 5GS (this deregistration may be implicit deregistration due to lack of coverage) and the UE 205 changes to SR mode with EPS only, then the UE 205 may update its radio capability (e.g., to increase radio capability by including the NR capability) to the other system where the UE 205 continues to be registered (e.g., in the EPS).

Note that by increasing the radio capability, the already selected core network for existing PDU Sessions or PDN Connections may need to be reselected. For example, if the UE 205 is registered to EPS/E-UTRAN and 5GS/NR and the UE 205 a) has not indicated NR capability to E-UTRAN and b) has not indicated E-UTRA capability to NR, the corresponding core network node (e.g., MME 235) may have selected user plane nodes (e.g., SGW or UPF) which do not support Dual Connectivity. Accordingly, after increasing the capability, e.g., after the UE 205 indicates Dual Connectivity support with multiple RATs, the core network (e.g., MME 235) may need to reselect another user plane node.

When considering UE capabilities, it should be differentiated between NAS layer capabilities and AS layer capabilities. For example, on the NAS layer the UE 205 may be capable of DR mode, may be 5GC NAS capable and/or EPC NAS capable, the UE 205 may support UP and/or CP CIoT optimizations or NB-IoT capability, to mention just some of the NAS layer capabilities. Additionally, on the AS layer, the UE 205 may support different RATs (e.g., UTRAN capable, E-UTRAN capable and/or NR capable) or different frequency bands and other features.

The UE 205 needs to differentiate between the following use cases for disabling/enabling 4G or 5G capability:

Use Case A: If the UE 205 disables 5G capability in order to stay attached with EPS only due to e.g., use of feature(s) non-supported in 5GS (e.g., ProSe, MBMS, CIoT optimizations, V2X etc.) but also other use cases can be possible, then the UE 205 does not indicate 5GC NAS to the EPC (e.g., MME 235) during NAS (e.g., TAU/Attach) procedure and the UE 205 disables the NR capability in the AS layer. With other words, "disabling 5G capability" means disabling the 5GC NAS capability and the AS capability (e.g., NR capability).

Similarly, if the UE 205 enables the 5G capability, then the UE 205 indicate 5GC NAS support to the EPC (e.g., MME 235) during NAS (e.g., TAU/Attach) procedure and the UE 205 enables the NR capability in the AS layer.

Please note that before disabling the 5G capability internally in the UE 205, in order to assure clean state(s) in the network functions in 5GS and avoid unnecessary paging or other signaling, the UE 205 may deregister in the 5GS. For example, the UE 205 sends a Deregistration Request message indicating an appropriate cause, e.g., moving to other system. If explicit deregistration is performed and after the UE 205 receives the Deregistration Accept message, the UE 205 transfers to RM-Deregistered state in 5GS and the NAS layer may trigger the AS layer to disable the NR capability and the NAS layer itself disables the 5GC NAS support. The deregistration may be also implicit.

Use Case B: If the UE 205 disables 5G capability due to e.g., use of DR mode (but also other use cases can be possible), then the UE 205 indicates 5GC NAS support to the EPC (e.g., MME 235) but disables only the NR capability in the AS layer. Therefore, in case of change between DR mode and SR mode, the talk is about AS capability change (e.g., RAT capability) and not of 5G capability change.

Similarly, if the UE 205 enables the 5G capability due to use of DR mode, the UE 205 indicates 5GC NAS support to the EPC (e.g., MME 235) during NAS (e.g., TAU/Attach) procedure and the UE 205 enables the NR capability in the AS layer.

When the DR-capable UE 205 is initially registered with the 5GC 210 and then discovers LTE coverage, the following steps may be taken. Note that in general the UE 205 first registers with a single system e.g., the UE 205 performs initial registration to 5GC in a PLMN (see messaging 255). Thus, the UE 205 would initially operate in a single registration mode and can announce its radio capability for multiple RATs (e.g., capable of NR and LTE). At some point of time the UE 205 determines to perform DR mode.

When the DR-capable UE 205 is initially registered with the EPC 215 and then discovers NR coverage, the following steps may be taken. Note that in general the UE 205 first registers with a single system e.g., the UE 205 performs initial attach to EPC 215 in a PLMN (see messaging 260). Thus, the UE 205 would initially operate in a single registration mode and can announce its radio capability for multiple RATs (e.g., capable of NR and LTE). At some point of time the UE 205 determines to perform DR mode.

In various embodiments, when registering with the EPC 215, the UE 205 indicates its capabilities, e.g., 5G NAS capable, support of "handover" for PDN connectivity, etc. Because the UE 205 intends to only use EPS currently (e.g., no NR coverage), the UE 205 indicate its E-UTRAN and NR capabilities to the LTE. The EPS/E-UTRAN may decide to configure Dual Connectivity with NR, if NR cell is available. The MME 235 indicates to the UE 205 that interworking with 5GS is supporting without N26.

While attached to the EPC 215, the UE 205 may discover NR coverage and decide to perform DR mode, i.e., to register with 5GS. Per Rel-15, a UE 205 wanting to use one or more EPS functionalities not supported by 5G System (e.g., ProSe, MBMS, CIOT optimizations, V2X, etc.), may disable all the related radio capabilities that allow the UE 205 to access 5G System when in CM-IDLE. Thus, radio capability change may be performed in CM/EMM Idle state, e.g., in order to prevent abrupt termination of services (disruption if active bearers) in CM/EMM Connected state.

Accordingly, the UE 205 may transition to CM/EMM Idle state to modify its radio capabilities in the EPS. In various embodiments, the UE 205 detects internally based on implementation, configuration (e.g., initiation of DR mode, termination of DR mode, 5GS non-supported feature use, etc.) that radio capability change should be performed in a first registered system. The UE 205 first enters CM/EMM Idle state before the NAS layer requests the AS layer to reconfigure the radio capabilities (e.g., increase or decrease radio capabilities). Afterwards the UE 205 performs NAS layer signaling to 1) to request update for the UE capability update (e.g., in 5GS or EPS) and 2) to change the registration in the corresponding system. If the UE 205 is in CM/EMM Connected and RRC Inactive state for long time, the UE 205 may request the deactivation of the RRC Inactive state (or requesting Idle state due to capability change/modification) using the NAS protocol or the RRC protocol.

For initiating 5GS to EPS dual registration operation: if the UE 205 is aware that the network supports 5GS-EPS interworking without N26 and the UE 205 is dual registration capable and is already registered with the 5GS, when the UE 205 determines to attach to a second system (e.g., EPS) in dual registration mode, the UE 205 performs the following procedures:

a. If the UE 205 is in connection management (CM) CONNECTED state in the first system, the UE 205 may indicate to the CN of the first system that capability change (e.g., reduce radio capabilities by excluding the radio capabilities of the RAT of a second system) is required. This indication may be performed via NAS layer signaling.
b. The 5GS (e.g., AMF 230) may disable RRC Inactive state in the NG-RAN.
c. The UE 205 enters CM IDLE state.
d. The NAS layer of the UE 205 indicates to the AS layer to disable the LTE capability when using NR.
e. The NAS layer of the UE 205 initiates registration update procedure towards AMF 230 to update its capabilities. The UE 205 indicates reduced capability to the NG-RAN (e.g., NR) node.
f. The UE 205 initiates NAS attach procedure with a second system (EPS) for DR mode.

For initiating EPS to 5GS dual registration operation: if the UE 205 is aware that the network supports EPS-5GS interworking without N26 and the UE 205 is dual registration capable and is already registered with the EPS, when the UE 205 determines to attach to a second system (e.g., 5GS) in dual registration mode, the UE 205 performs the following procedures:
a. If the UE 205 is in connection management (CM) CONNECTED state in the first system, the UE 205 may indicate to the CN of the first system that capability change (e.g., reduce radio capabilities by excluding the radio capabilities of the RAT of a second system) is required. This indication may be performed via NAS layer signaling.
b. The EPS (e.g., MME 235) may disable RRC Inactive state in the LTE-RAN.
c. The UE 205 enters CM IDLE state.
d. The NAS layer of the UE 205 indicates to the AS layer to disable the NR capability when using LTE.
e. The NAS layer of the UE 205 initiates registration update procedure towards MME 235 to update its capabilities. The UE 205 indicates reduced capability to the LTE-RAN node.
f. The UE 205 initiates NAS register procedure with a second system (5GS) for DR mode.

Figure 3A:
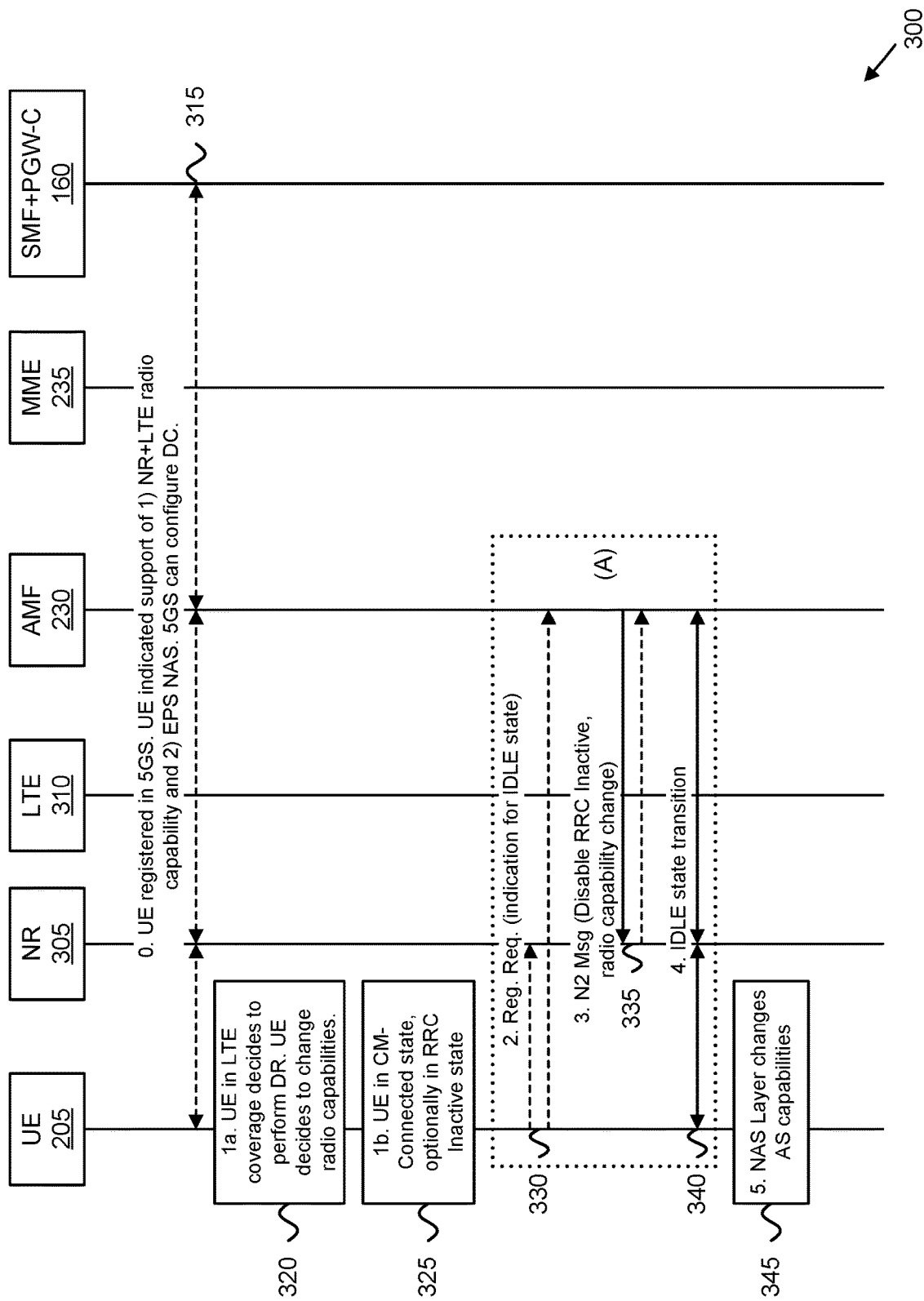
FIG. 3A is a block diagram illustrating one procedure for modifying a radio capability.
Figure 3B:
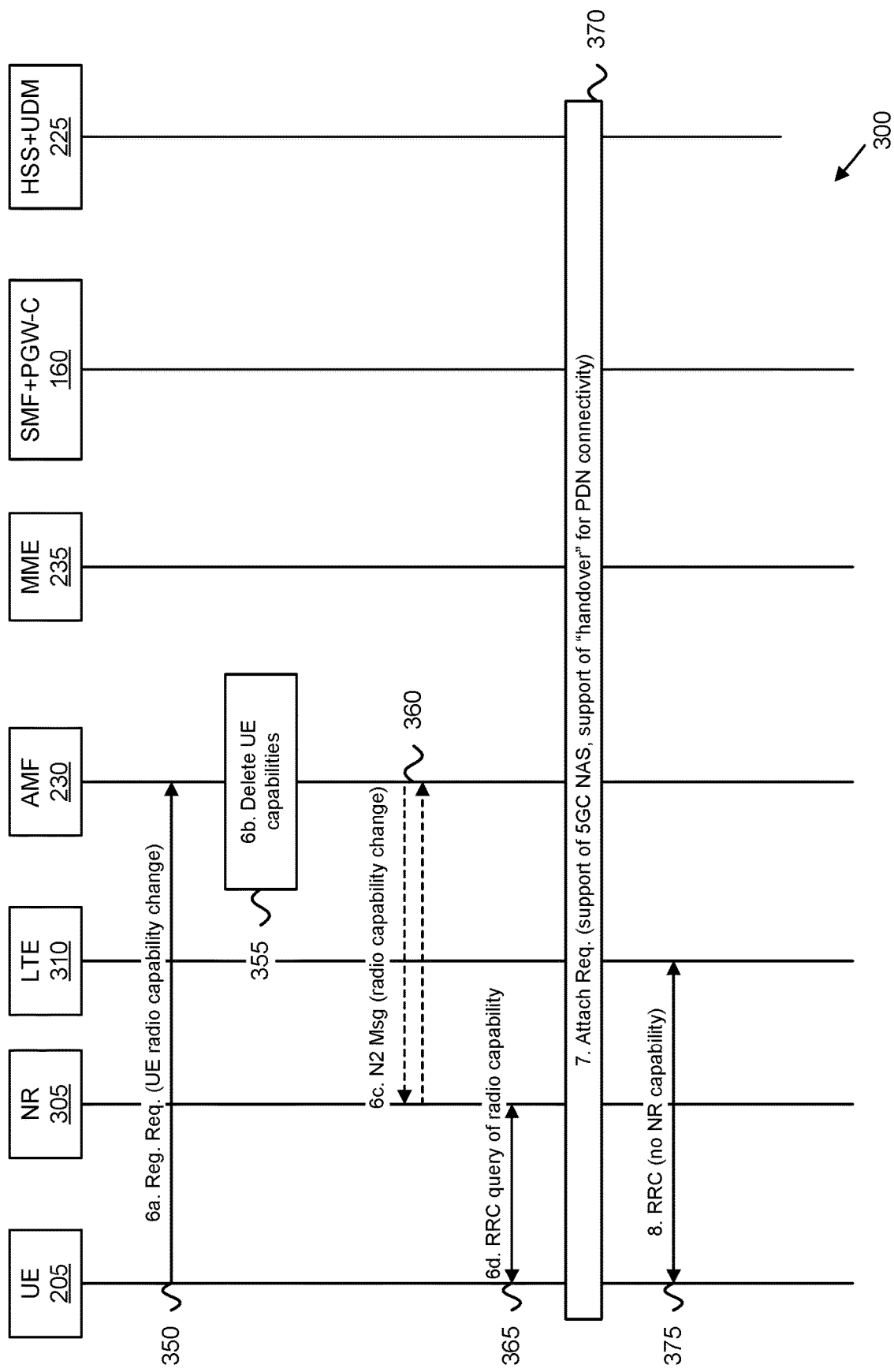
FIG. 3B is a continuation of FIG. 3A.

FIGS. 3A-3B depict a first procedure 300 for radio capability change of a UE 205, according to embodiments of the disclosure. The first procedure 300 involves the UE 205, an NR RAN 305, an LTE RAN 310, the AMF 230, the MME 235, a SMF+PGW-C 160, and the HSS+UDM 225. The steps shown in FIGS. 3A-3B are as described follows:

The procedure 300 begins at FIG. 3A. In step 0: The UE 205 is registered in 5GS (see messaging 315). The UE 205 has indicated support of 1) NR+LTE radio capability to the NG-RAN node and 2) EPS NAS capability to the AMF 230. In certain embodiments, the 5GS may configure Dual Connectivity. The 5GS indicates to the UE 205 the interworking without N26 is supported.

Step 1: The UE 205 detects LTE coverage and determines to initiate dual registration mode of operation. The UE 205 decides to change radio capabilities in the currently used system, e.g., in the 5GS/NR (see block 320). The UE 205 also determines that it is in CM Connected state and either in RRC Connected or RRC Inactive state (see block 325).

Step 2: If the UE 205 is in CM/EMM Connected state, the UE 205 may determine to initiate transition to CM Idle state. For this purpose, the UE 205 may perform one of the following actions:

The UE 205 NAS layer may query the RRC layer about the RRC state (i.e., RRC Connected or RRC Inactive state). If the RRC state is RRC Inactive, the UE 205 may send a NAS indication to the AMF 230 to request disablement of the RRC Inactive state. For example, the UE 205 can send a Registration Request message having a type of Mobility Registration Update with indication 'transfer to Idle state' or 'disable RRC Inactive state' or a similar indication). In addition, the UE 205 may indicate the reason for transition to Idle state, e.g., UE 205 needs to change AS layer capabilities.

The UE 205 may send NAS Deregistration Request message to the AMF 230 with an indication that the Deregistration is due to UE 205 radio capability change and an indication that re-registration is (e.g., soon) expected (see messaging 330). In such case, the AMF 230 may initiate a deregistration procedure, for example the deregistration procedure described in 3GPP TS 23.502 version 15.1.0. At the end of the deregistration procedure, the UE 205 state in the AMF 230 is RM-Deregistered. The AMF 230 may however keep the security context downloaded previously from the UDM/UDR because the AMF 230 may expect re-registration soon.

The UE 205 may send an RRC message to the NG-RAN node (e.g., gNB) to indicate to disable the RRC Inactive state (see messaging 330). For this purpose, the UE 205 may perform the RRC resume procedure with an indication to disable RRC Inactive state.

Step 3: AMF 230 to NR RAN 305: The AMF 230 initiates N2 procedure for disabling the RRC Inactive state, if the RRC state is RRC Inactive (see messaging 335). An existing N2 message or a new N2 message can be used to request the NG-RAN node to disable the RRC Inactive state. If the AMF 230 is not aware about the RRC state, the AMF 230 may request the RAN node to release the UE context of the UE 205.

Optionally, the AMF 230 may include an indication that the release is not urgent and can be performed upon UE Inactivity. For example, the AMF 230 may use N2 UE Context Release Request (release cause value, delay tolerant release), where the cause value may indicate the reason for releasing the UE context, e.g., UE radio capability change. The 'delay tolerant release' indicates to the RAN node that the RRC connection can be release upon UE Inactivity (e.g., short inactivity of 5 seconds or 10 seconds), so that the release is not urgent.

Step 4: The NG-RAN node performs procedure for RRC Idle state transition, e.g., after Inactivity timer expires (see messaging 340).

Step 5: UE 205 in CM/EMM Idle or RM Deregistered state: the NAS layer performs AS layer modification (see block 345). For example, the AS layer may increase or decrease radio capabilities, e.g., by including or excluding a RAT capability.

The procedure 300 continues at FIG. 3B. In step 6a, UE 205 to CN (e.g., AMF 230): (Note, the UE 205 may be in CM/EMM Idle state) UE 205 initiates NAS procedure (e.g., Registration procedure) to indicate change of its radio capabilities (e.g., to reduce radio capabilities by excluding the radio capabilities of a RAT or to increase the radio capabilities) (see messaging 350). The UE 205 may use Registration Request message having a type of Mobility Registration Update and including an indication that radio capability change is required. This indication can be called e.g., 'UE 205 radio capability' or 'UE 205 radio capability change' or any other similar parameter name can be used. This 'UE 205 radio capability change' indication causes at the AMF 230 to perform the steps 6b and/or 6c. The AMF 230 may reply to the UE 205 with Registration Accept message including an appropriate cause value of accepting or rejecting the requested radio capability change.

In step 6b: The AMF 230 deletes the already stored UE 205 radio capabilities received previously from the NG-RAN node (see block 355).

In step 6c: The AMF 230 initiates N2 procedure to inform the RAN node that the AS capabilities are changed (see messaging 360). The AMF 230 does not include already stored UE 205 radio capabilities. The AMF 230 may send UE 205 context to the RAN node, so that the RAN node can know that the AS capabilities are changed.

In step 6d: The NG-RAN node initiates RRC procedure to query the UE 205 radio capabilities (see messaging 365). The UE 205 announces/sends its radio capabilities by excluding the E-UTRA capabilities, since the AS layer has been instructed so by the NAS layer.

If the UE 205 is in CM/EMM Connected state and the RRC Inactive state (please note that the AMF 230 may be aware about the activation of RRC Inactive state if the AMF 230 has subscribed to RRC state notification as described in TS 23.502 clause 4.8.3 "N2 Notification procedure") and the indication 'UE 205 radio capability change' is included, the AMF 230 may decide first to disable the RRC Inactive state.

If the UE 205 is in RM-Deregistered state, the UE 205 does not need to include 'UE 205 radio capability' indication, as the AMF 230 would have already deleted the previously stored UE 205 radio capabilities. The UE 205 performs normal Registration procedure with type Initial registration.

Step 7: The UE 205 initiates Attach procedure in the EPC/E-UTRAN system (see block 370).

Step 8: If the UE 205 is registered to another system (e.g., using DR mode and already registered to 5GS), the UE 205 announces (or sends) its AS layer capability (i.e., the E-UTRA capability) to the eNB, but the UE 205 excludes the NR radio capability (see messaging 375).

Note that steps 2-4 (grouped in the dotted line box (A)) show one solution option for explicit UE-initiated signaling for disabling the RRC Inactive state or for transition to CM Idle state. Another option is to integrate the RRC Inactive state disablement procedure in the Registration procedure for UE capability change, e.g., as shown in step 6. Also, note that FIG. 4 shows an example signaling flow for the case where the UE 205 is registered first to the 5GS and the UE 205 attempts a DR mode operation with EPS later.

For initiating EPS to 5GS dual registration case: analogically to the above, just exchanging the EPS and 5GS. In other embodiments, similar signaling flow is also applicable in the scenario where the UE 205 is first attached in the EPS and the UE 205 attempts a DR mode operation with 5GS. In such case, the UE 205 would first need to decrease its radio capabilities in the EPS, i.e., to disable the NR capability, and then the UE 205 attempts Registration procedure to the 5GS via NR. In such embodiments, UE 205 preform at least steps 2 and/or 5 towards the EPS (e.g., eNB and/or MME 235) to request Idle state or disable the RRC Inactive state in the E-UTRAN.

Figure 4:
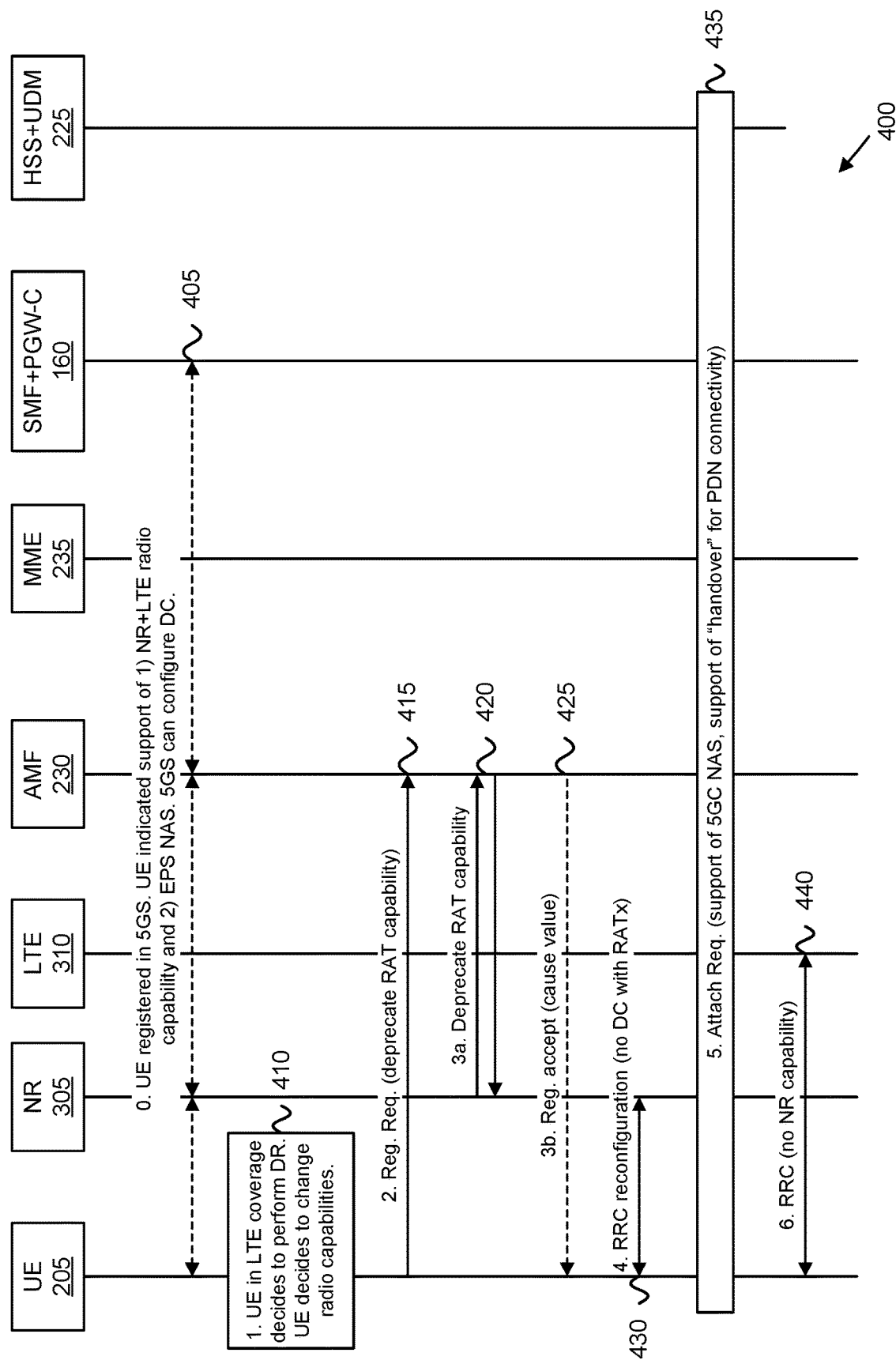
FIG. 4 is a block diagram illustrating another procedure for modifying a radio capability.

FIG. 4 shows a second procedure 400 for radio capability change of a UE 205, according to embodiments of the disclosure. The second procedure 400 involves the UE 205, an NR RAN 305, an LTE RAN 310, the AMF 230, the MME 235, a SMF+PGW-C 160, and the HSS+UDM 225. The steps shown in FIG. 4 are as described follows:

The UE 205 sends a request to the network (e.g., an indication in NAS message to the mobility serving node (e.g., MME 235 or AMF 230)) that a particular AS capability (e.g., RAT capability) should not be considered (i.e., the RAT capability is deprecated/disclaimed). In such case UE 205 radio capability is decreased without sending the full radio capability to the network. In similar way, the UE 205 can at any time endorse the use of the deprecated RAT capability, i.e., the UE 205 can increase its capability without sending the full radio capability, but instead abolishing/canceling previously deprecated capability. This solution may be applicable to any of the UE 205 states, e.g., CM/EMM Connected or CM/EMM Idle.

For example, the UE 205, which is attached to EPS and having announces E-UTRA and NR capability to the E-UTRAN, indicates in NAS signaling to the MME 235 that the NR shall not be considered for dual connectivity. The UE 205 may trigger such signaling e.g., based on starting a DR-mode and registering with 5GS/NR. Then the MME 235 indicates to the RAN node (e.g., eNB) that dual connectivity with NR shall not be configured. Upon the signaling from the MME 235, the eNB learns that UE 205's radio capability has not changed, but the eNB shall not consider configuring the DC with NR for this UE 205.

If the UE 205 changes from DR mode to SR mode and stays attached to a first system (e.g., EPS) or other trigger events for increasing the radio capability occur, the UE 205 sends an indication in NAS signaling to the MME 235 that the deprecated RAT capability (e.g., NR capability) may be endorsed, i.e., the deprecated RAT capability can be considered for dual connectivity. With other words, the NAS signaling 'activates' a deprecated RAT (e.g., NR) capability.

Step 0: The UE 205 is registered in 5GS (see messaging 405). The UE 205 has indicated support of 1) NR+LTE radio capability to the NG-RAN node and 2) EPS NAS capability to the AMF 230. 5GS can configure dual connectivity (DC). The 5GS indicates to the UE 205 the interworking without N26 is supported.

Step 1: The UE 205 detects LTE coverage and determines to initiate dual registration mode of operation (see block 410). The UE 205 decides to change radio capabilities in the currently used system, e.g., in the 5GS/NR. The UE 205 may determine that it is in CM Connected state and RRC Inactive state.

Step 2: The UE 205 initiates NAS procedure towards the core network (e.g., AMF 230) indicating that a particular AS capability (e.g., RAT capability) is deprecated (see messaging 415). With other words this RAT capability should not be considered for dual connectivity (DC) configuration. For example, the UE 205 may send a Registration Request message including an indication that the E-UTRA capability should not be considered in the system.

Step 3a: From CN to RAN: (if the UE 205 is in CM/EMM Connected state,) the AMF 230 initiates UE 205 Context updated procedure towards the NG-RAN node to indicate that a particular UE 205 radio capability is deprecated (see messaging 420). For example, the AMF 230 indicates to the NG-RAN node that the NR capability is deprecated, i.e., dual connectivity with E-UTRAN should not be configured.

Step 3b: After the RAN node acknowledges the reception (and possibly processing of the requested to deprecate RAT capability) (see messaging 425). The Core network (e.g., the AMF 230) may respond to the registration request of step 2 by sending an appropriate cause value whether the request from step 2 is accepted or rejected.

Step 4: The NG-RAN node performs RRC reconfiguration to disable the UE 205 radio measurements in the indicated RAT (e.g., in the E-UTRA) (See messaging 430).

Step 5: The UE 205 initiates Attach procedure in the EPC/E-UTRAN system (see block 435).

Step 6: The UE 205 announces E-UTRA capability to the eNB, but the UE 205 excludes the NR radio capability (see block 440).

Figure 5:
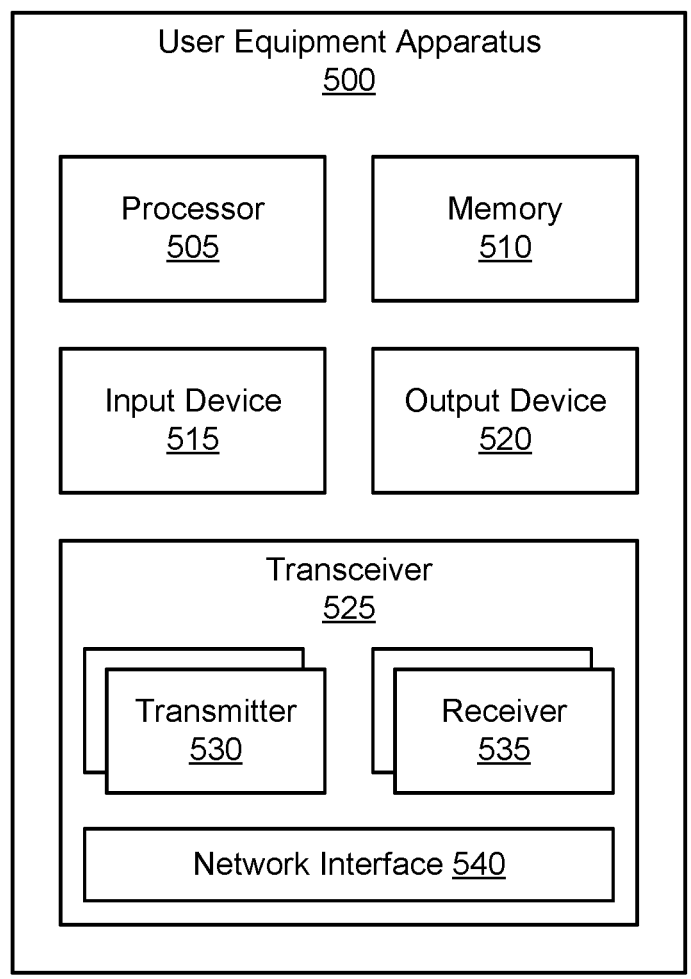
FIG. 5 is a block diagram illustrating a user equipment apparatus for modifying a radio capability.

In summary, the FIG. 5 shows a method for deprecating a particular AS capability, e.g., using NAS signaling, without the need to send the complete UE 205 radio capabilities to the network (e.g., to the RAN node). Please note that FIG. 5 shows an example signaling flow for the case where the UE 205 is registered first to the 5GS and the UE 205 attempts a DR mode operation with EPS later.

In another embodiment, it is also possible that the UE 205 abolishes the deprecated AS capability at some point, i.e., the UE 205 enables (or endorses) the deprecated AS capability. For example, the UE 205 sends a NAS message (e.g., Registration Request message or TAU request message) including an indication that a deprecated AS capability (e.g., deprecated RAT capability) should be enabled. Then the core network (e.g., MME 235 or AMF 230) updates the RAN node via S1 or N2 interface with an indication to enable the deprecated AS capability. The RAN node can perform RRC reconfiguration to configure the UE 205 to report measurements for previously deprecated RAT.

In another embodiment related to the FIG. 4, similar signaling flow is also applicable in the scenario where the UE 205 is first attached in the EPS and the UE 205 attempts a DR mode operation with 5GS. In such case, the UE 205 would first deprecate particular AS capabilities in the EPS, i.e., to disable the NR capability, and then the UE 205 attempts Registration procedure to the 5GS via NR.

In yet another embodiment related to the FIG. 4, the network may determine to deprecate a particular AS capability (e.g., RAT capability) without explicit indication by the UE 205. For example, this can be performed including signaling exchange via HSS+UDM 225. When a UE 205 registered to 5GS decides to use DR mode and attempts to attach to the EPS (e.g., MME 235), the MME 235 updates the HSS+UDM 225 indicating that the UE 205 is attaching for DR mode of operation. The HSS+UDM 225 informs the AMF 230 that the UE 205 is now in addition attached to the EPS. Then the AMF 230 initiates signaling towards the RAN node (e.g., gNB) to indicate that the E-UTRA capability is deprecated. The AMF 230 assumes that the UE 205 has sent E-UTRA capability to gNB because the E-UTRA is a native RAT in NG-RAN.

In certain embodiments, the UE 205 may determine to not send radio measurement reports to the RAN node including measurements from a RAT which the UE 205 uses in another system. For example, if the UE 205 has announced NR capabilities to the E-UTRAN node and the UE 205 is configured to perform measurements of NR cell, and the UE 205 is in DR mode with the 5GC/NR, the UE 205 determines to not report radio measurements of NR cell even if the UE 205 can measure signal from NR cell. This can be done by either signaling some special or reserved values; that indicate to the network that the UE 205 is neither measuring NR cell nor is it interested in being handed over to NR cell; or, by not making any measurements at all. In any case, the UE 205 shall report only especial or Zero signal level (RSRP for example) if periodic reporting is configured. The UE 205 may reject measurement gaps configured for such purposes. Alternatively, a UE 205 may directly indicate to the RAN network that it is not interested in measuring or being handed over to an NR cell, by way of a new RRC signaling just for example.

In certain embodiments, if the UE 205 is operating in DR mode, but the UE 205 is only attached/registered with the first system (e.g., 5GS) without established PDN connection or PDU Session, then the UE 205 continues to use its dual radio capabilities, i.e., the UE 205 uses the first system radio capability (e.g., NR capabilities) to the second system (e.g., EPS). Before the UE 205 initiates PDN connection establishment or PDU Session establishment in the first system, the UE 205 performs radio capability update procedure in the second system in order to exclude the radio capabilities of the first system (e.g., exclude NR capability).

Please note that the use cases for triggering radio capability change can be various. In some embodiments the assumption is the enablement or disablement of DR mode, however other use cases are possible. For example, the modem capabilities (e.g., mobile equipment (ME) capability) changes due to hardware modification like attaching or detaching hardware to the terminal. Another example is that the user can enable or disable terminal capability via the phone's menu.

FIG. 5 depicts a user equipment apparatus 500 that may be used for UE power control for multiple UL carriers, according to embodiments of the disclosure. The user equipment apparatus 500 may be one embodiment of the remote unit 105 and/or UE 205, described above. Furthermore, the user equipment apparatus 500 may include a processor 505, a memory 510, an input device 515, an output device 520, a transceiver 525 for communicating with one or more base units 110.

As depicted, the transceiver 525 may include a transmitter 530 and a receiver 535. The transceiver 525 may also support one or more network interfaces 540, such as the Uu interface used to communicate with a gNB, or another suitable interface for communicating with a RAN (e.g., first access network 120 and/or second access network 125). In some embodiments, the input device 515 and the output device 520 are combined into a single device, such as a touchscreen. In certain embodiments, the user equipment apparatus 500 may not include any input device 515 and/or output device 520.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 registers with a first communication system via the RAN node. In some embodiments, registering with the first communication system includes indicating one or more UE radio capabilities for at least one RAT to the first communication system.

The processor 505 detects a trigger to perform radio capability change for at least one radio access technology ("RAT"). In some embodiments, detecting a trigger to perform radio capability change includes determining to perform dual-registration with a second communication system. In some embodiments, detecting a trigger to perform radio capability change includes determining to register with a second communication system, the second system different than the first system. In certain embodiments, the first and second communication systems belonging to the same PLMN. In certain embodiments, the first communication system includes an evolved packet core network and wherein the second communication system includes a 3GPP fifth generation core network.

The processor 505 transitions the UE state of the user equipment apparatus 500 to an idle state. In various embodiments, transitioning the UE state to an idle state includes entering a Connection Management ("CM") Idle state on the NAS layer. In such embodiments, a NAS entity instructs a UE Access Stratum ("AS") entity to discard/deactivate the existing AS context and instructs the UE AS entity to modify an AS layer capability for the user equipment apparatus 500 in response to entering the CM Idle state. In certain embodiments, modifying the AS layer capability includes disabling a UE capability for a particular radio access technology. In certain embodiments, modifying the AS layer capability includes enabling a UE capability for a particular radio access technology. In certain embodiments, entering the CM Idle state includes deactivating the AS context to enter a radio resource control ("RRC") idle state using, e.g., NAS signaling and/or RRC signaling.

The processor 505 requests the network (e.g., the first communication system) to update one or more UE radio capabilities while in the idle state. In some embodiments, requesting to update one or more UE radio capabilities includes performing a radio capability exchange towards the RAN node.

In various embodiments, requesting to update one or more UE radio capabilities includes using a NAS signaling procedure to indicate the update of one or more UE radio capabilities. In one embodiment, requesting to update one or more UE radio capabilities includes sending a NAS registration request. Here, the NAS registration has a mobility registration type and indicates the updated one or more UE radio capabilities. In another embodiment, requesting to update one or more UE radio capabilities includes sending a tracking area update ("TAU") request. Here, the TAU request indicates the updated one or more UE radio capabilities.

In some embodiments, detecting a trigger to perform radio capability change includes detecting a need to change an Access Stratum ("AS") capability of the user equipment apparatus 500. In such embodiments, requesting to update one or more UE radio capabilities includes requesting that a particular AS capability be deprecated, wherein the RAN node does not consider the particular AS capability. In certain embodiments, requesting that a particular AS capability be deprecated includes sending one of a NAS message and an RRC message to a core network.

In certain embodiments, requesting that a particular AS capability be deprecated includes indicating that a previously indicated RAT capability is deprecated. In certain embodiments, requesting that a particular AS capability be deprecated includes indicating that the core network does not need to update the UE radio capability. In some embodiments, detecting the need to change the AS capability of the user equipment apparatus 500 includes determining to register with a second communication system. In certain embodiments, the processor 505 further sends a request to the network to abolish the deprecated AS capability.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to modifying a radio capability. For example, the memory 510 may store radio capabilities, registrations, and the like. In certain embodiments, the memory 510 also stores program code and related data, such as an operating system or other controller algorithms operating on the remote unit 105.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 includes at least transmitter 530 and at least one receiver 535. One or more transmitters 530 may be used to provide UL communication signals to a base unit 110. Similarly, one or more receivers 535 may be used to receive DL communication signals from the base unit 110, as described herein. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

As discussed above, the transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver (or portions thereof) at particular times in order to send and receive messages. The transceiver 525 may include one or more transmitters 530 and one or more receivers 535. In certain embodiments, the one or more transmitters 530 and/or the one or more receivers 535 may share transceiver hardware and/or circuitry. For example, the one or more transmitters 530 and/or the one or more receivers 535 may share antenna(s), antenna tuner(s), amplifier(s), filter(s), oscillator(s), mixer(s), modulator/demodulator(s), power supply, and the like.

In various embodiments, the transceiver 525 is configured to communication with 3GPP access network(s) and/or non-3GPP access network(s). In some embodiments, the transceiver 525 implements modem functionality for the 3GPP access network(s) and/or the non-3GPP access network(s). In one embodiment, the transceiver 525 comprises a chip that implements multiple logical transceivers using different communication protocols or protocol stacks, while using common physical hardware. For example, the transceiver 525 may include one application-specific integrated circuit ("ASIC") which includes the function of first transceiver and second transceiver for accessing networks of different RATs. In other embodiments, the transceiver 525 comprises separate transceiver hardware for accessing networks of different RATs.

Figure 6:
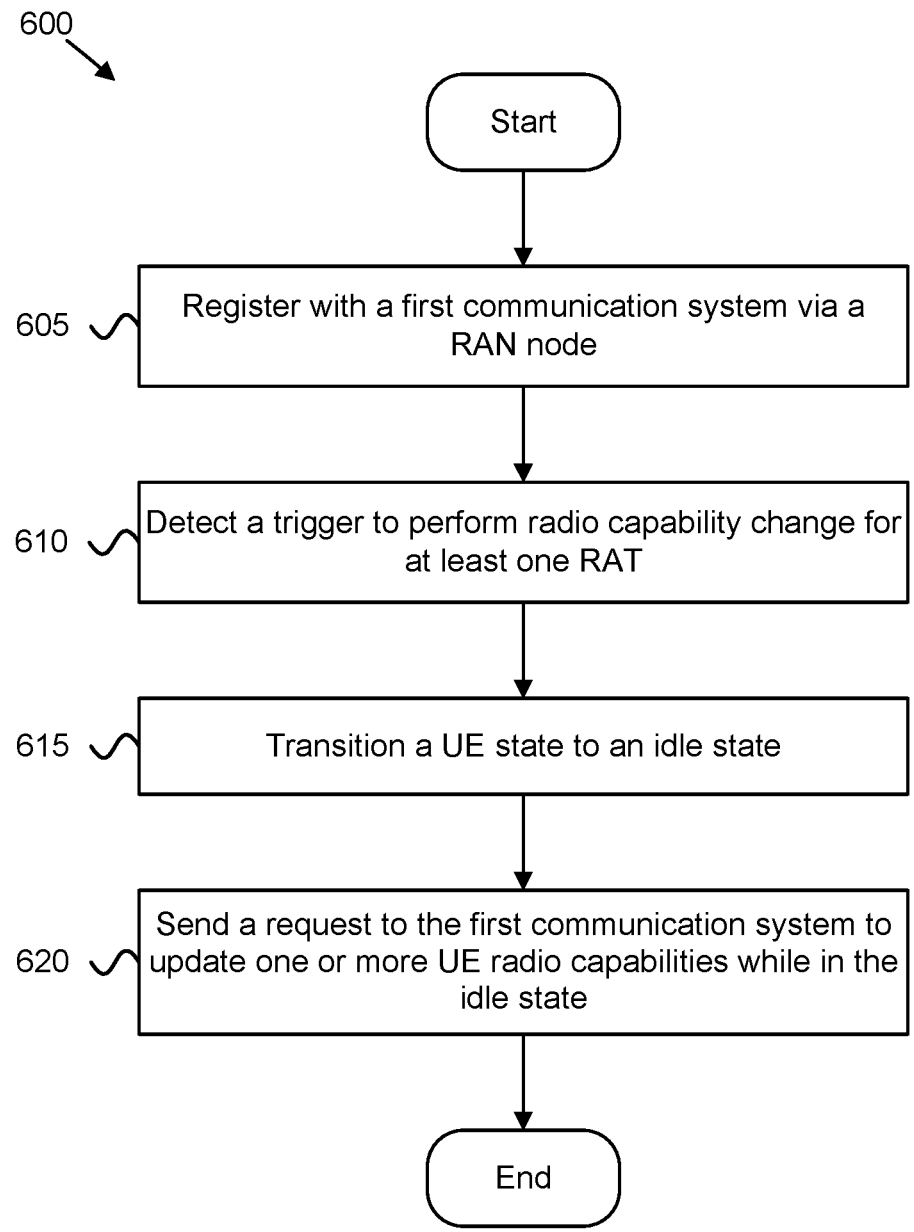
FIG. 6 is a flow chart diagram illustrating one method of modifying a radio capability.

FIG. 6 is a schematic flow chart diagram illustrating one embodiment of a method 600 for modifying a radio capability, according to embodiments of the disclosure. In some embodiments, the method 600 is performed by a UE, such as the remote unit 105, the UE 205, and/or the user equipment apparatus 500. In certain embodiments, the method 600 may be performed by a processor executing program code, for example, a microcontroller, a microprocessor, a CPU, a GPU, an auxiliary processing unit, a FPGA, or the like.

The method 600 includes registering 605 with a first communication system via a radio access network ("RAN") node. In some embodiments, registering with the first communication system includes indicating one or more UE radio capabilities for at least one RAT to the first communication system.

The method 600 includes detecting 610 a trigger to perform radio capability change for at least one radio access technology ("RAT"). In some embodiments, detecting 610 a trigger to perform radio capability change includes determining to register with a second communication system, the second system different than the first system. In certain embodiments, the first and second communication systems belonging to the same PLMN. In certain embodiments, the first communication system includes an evolved packet core network and wherein the second communication system includes a 3GPP fifth generation core network.

The method 600 includes transitioning 615 the UE state to an idle state. In various embodiments, transitioning 615 the UE state to an idle state includes entering a Connection Management ("CM") Idle state on the NAS layer entity of the UE. In certain embodiments, entering the CM Idle state includes deactivating the AS context (e.g., using NAS signaling or RRC signaling) to enter an RRC idle state.

The method 600 includes sending 620 a request to the network to update one or more UE radio capabilities while in the idle state. The method 600 ends. In some embodiments, sending 620 the request to update one or more UE radio capabilities includes using a Non-Access Stratum ("NAS") signaling procedure to indicate the update of one or more UE radio capabilities. In one embodiment, sending 620 the request to update one or more UE radio capabilities includes sending a NAS registration request, said request having a mobility registration type and indicating the updated one or more UE radio capabilities. In another embodiment, sending 620 the request to update one or more UE radio capabilities includes sending a tracking area update request, said request indicating the updated one or more UE radio capabilities.

In certain embodiments, detecting 610 a trigger to perform radio capability change includes determining to perform dual-registration with a second communication system. In such embodiments, sending 620 the request to update one or more UE radio capabilities includes performing a radio capability exchange towards the RAN node.

In some embodiments, detecting 610 a trigger to perform radio capability change includes detecting a need to change an Access Stratum ("AS") capability of the UE, wherein sending 620 the request to update one or more UE radio capabilities includes requesting that a particular AS capability be deprecated, wherein the RAN node does not consider the particular AS capability. In certain embodiments, detecting the need to change the AS capability of the UE includes determining to register with a second communication system.

In certain embodiments, requesting that a particular AS capability be deprecated includes sending a NAS message or an RRC message to a core network. In certain embodiments, requesting that a particular AS capability be deprecated includes indicating that a previously indicated RAT capability is deprecated. In certain embodiments, requesting that a particular AS capability be deprecated includes indicating that the core network does not need to update the UE radio capability.

Disclosed herein is a first apparatus for modifying a radio capability. The first apparatus may be implemented by the remote unit 105, the UE 205, and/or the user equipment apparatus 500. The first apparatus includes a processor and a transceiver that communicates with a RAN node. The processor registers with a first communication system via the RAN node. The processor detects a trigger to perform radio capability change for at least one radio access technology ("RAT") and transitions a UE state of the apparatus to an idle state. The processor further sends a request to the first communication system to update one or more UE radio capabilities while in the idle state.

In some embodiments, registering with the first communication system includes indicating one or more UE radio capabilities for at least one RAT to the first communication system. In some embodiments, detecting a trigger to perform radio capability change includes determining to perform dual-registration with a second communication system. In such embodiments, sending the request to update one or more UE radio capabilities includes performing a radio capability exchange towards the RAN node, wherein the processor updates one or more UE radio access technology capabilities of the second communication system during the radio capability exchange.

In various embodiments, sending the request to update one or more UE radio capabilities includes using a Non-Access Stratum ("NAS") signaling procedure to indicate the update of one or more UE radio capabilities. In one embodiment, sending the request to update one or more UE radio capabilities includes sending a NAS registration request. Here, the NAS registration has a mobility registration type and indicates the updated one or more UE radio capabilities. In another embodiment, sending the request to update one or more UE radio capabilities includes sending a tracking area update ("TAU") request. Here, the TAU request indicates the updated one or more UE radio capabilities.

In some embodiments, detecting a trigger to perform radio capability change includes determining to register with a second communication system, the second system different than the first system. In certain embodiments, the first and second communication systems belonging to the same PLMN. In certain embodiments, the first communication system includes an evolved packet core network and wherein the second communication system includes a 3GPP fifth generation core network.

In various embodiments, transitioning the UE state to an idle state includes entering a Connection Management ("CM") Idle state on the Non-Access Stratum ("NAS") layer. In such embodiments, the first apparatus includes a NAS entity that instructs a UE Access Stratum ("AS") entity to discard (or deactivate) the existing AS context and instructs the UE AS entity to modify an AS layer capability for the apparatus in response to entering the CM Idle state. In certain embodiments, modifying the AS layer capability includes disabling a UE capability for a particular radio access technology. In certain embodiments, modifying the AS layer capability includes enabling a UE capability for a particular radio access technology. In certain embodiments, entering the CM Idle state includes deactivating the AS context to enter a radio resource control ("RRC") idle state using, e.g., NAS signaling and/or RRC signaling.

In some embodiments, detecting a trigger to perform radio capability change includes detecting a need to change an Access Stratum ("AS") capability of the apparatus. In such embodiments, sending the request to update one or more UE radio capabilities includes requesting that a particular AS capability be deprecated, wherein the RAN node does not consider the particular AS capability. In certain embodiments, requesting that a particular AS capability be deprecated includes sending wither a NAS message or an RRC message to a core network.

In certain embodiments, requesting that a particular AS capability be deprecated includes indicating that a previously indicated RAT capability is deprecated. In certain embodiments, requesting that a particular AS capability be deprecated includes indicating that the core network does not need to update the UE radio capability. In some embodiments, detecting the need to change the AS capability of the apparatus includes determining to register with a second communication system. In certain embodiments, the processor further sends a request to the network to abolish the deprecated AS capability.

Disclosed herein is a first method for modifying a radio capability. The first method may be performed by a UE, such as the remote unit 105, the UE 205, and/or the user equipment apparatus 500. The first method includes registering with a first communication system via a radio access network ("RAN") node and detecting a trigger to perform radio capability change for at least one radio access technology ("RAT"). The first method includes transitioning a UE state to an idle state and sending a request to the first communication system to update one or more UE radio capabilities while in the idle state.

In some embodiments, registering with the first communication system includes indicating one or more UE radio capabilities for at least one RAT to the first communication system. In certain embodiments, detecting a trigger to perform radio capability change includes determining to perform dual-registration with a second communication system. In such embodiments, sending the request to update one or more UE radio capabilities includes performing a radio capability exchange towards the RAN node. Here, the first method may also include updating one or more UE radio access technology capabilities of the second communication system during the radio capability exchange.

In some embodiments, sending the request to update one or more UE radio capabilities includes using a Non-Access Stratum ("NAS") signaling procedure to indicate the update of one or more UE radio capabilities. In one embodiment, sending the request to update one or more UE radio capabilities includes sending a NAS registration request, said request having a mobility registration type and indicating the updated one or more UE radio capabilities. In another embodiment, sending the request to update one or more UE radio capabilities includes sending a tracking area update request, said request indicating the updated one or more UE radio capabilities.

In some embodiments, detecting a trigger to perform radio capability change includes determining to register with a second communication system, the second system different than the first system. In certain embodiments, the first and second communication systems belonging to the same PLMN. In certain embodiments, the first communication system includes an evolved packet core network and wherein the second communication system includes a 3GPP fifth generation core network.

In various embodiments, transitioning to an idle state includes entering a Connection Management ("CM") Idle state on the Non-Access Stratum ("NAS") layer of the UE. In such embodiments, the first method may include a NAS entity instructing a UE Access Stratum ("AS") entity to discard/deactivate the existing AS context and instructing the UE AS entity to modify an AS layer capability for the UE in response to entering the CM Idle state. In certain embodiments, modifying the AS layer capability includes disabling a UE capability for a particular radio access technology. In certain embodiments, modifying the AS layer capability includes enabling a UE capability for a particular radio access technology. In certain embodiments, entering the CM Idle state includes deactivating the AS context to enter a radio resource control ("RRC") idle state using, e.g., NAS signaling and/or RRC signaling.

In some embodiments, detecting a trigger to perform radio capability change includes detecting a need to change an Access Stratum ("AS") capability of the UE, wherein sending the request to update one or more UE radio capabilities includes requesting that a particular AS capability be deprecated, wherein the RAN node does not consider the particular AS capability. In certain embodiments, detecting the need to change the AS capability of the UE includes determining to register with a second communication system. Here, the first method may include sending a request to the network to abolish the deprecated AS capability.

In certain embodiments, requesting that a particular AS capability be deprecated includes sending a NAS message or an RRC message to a core network. In certain embodiments, requesting that a particular AS capability be deprecated includes indicating that a previously indicated RAT capability is deprecated. In certain embodiments, requesting that a particular AS capability be deprecated includes indicating that the core network does not need to update the UE radio capability.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a transceiver that communicates with a radio access network ("RAN") node using a first radio access technology ("RAT"); and
a processor that registers with a first communication system via the RAN node;
detects a trigger to perform radio access capability update for at least one RAT used for communication with the first communication system, the trigger comprising one of: a determination that a second RAT is used in parallel with the first RAT, a determination that the second RAT is used not in parallel with the first RAT, or a determination to use a service not supported by the first communication system;
transitions the apparatus to an idle state;
establishes a new connection; and
sends a request to the first communication system when establishing the new connection, the request comprising a parameter that indicates that a particular User Equipment ("UE") radio access capability related to the first communication system is updated, the particular UE radio access capability being a capability to use a specific RAT, where the request comprises an indication to delete stored UE radio access capabilities in a network and retrieve new UE radio access capabilities.

2. The apparatus of claim 1, wherein registering with the first communication system comprises indicating one or more UE radio access capabilities for at least one RAT to the first communication system.

3. The apparatus of claim 1, wherein sending the request to the first communication system comprises using a Non-Access Stratum ("NAS") signaling procedure to indicate an update of the particular UE radio access capability.

4. The apparatus of claim 3, wherein sending the request to the first communication system comprises sending a NAS registration request, the request having a mobility registration type and indicating the update of the particular UE radio access capability.

5. The apparatus of claim 3, wherein sending the request to the first communication system comprises sending a tracking area update request, the request indicating the update of the particular UE radio access capability.

6. The apparatus of claim 1, wherein detecting the trigger to perform radio access capability update comprises determining to register with a second communication system, the second communication system different than the first communication system.

7. The apparatus of claim 6, wherein the first and second communication systems belong to a same Public Land Mobile Network ("PLMN").

8. The apparatus of claim 6, wherein the first communication system comprises an evolved packet core network and wherein the second communication system comprises a 3GPP fifth generation core network.

9. The apparatus of claim 1, wherein detecting the trigger to perform radio access capability update comprises determining to perform a dual-registration with a second communication system.

10. The apparatus of claim 9, wherein sending the request to the first communication system comprises performing a radio access capability exchange towards the RAN node, wherein the processor updates one or more UE radio access technology capabilities of the second communication system during the radio access capability exchange.

11. The apparatus of claim 1, wherein transitioning the apparatus to the idle state comprises entering a Connection Management ("CM") Idle state on a Non-Access Stratum ("NAS") layer, the apparatus comprising a NAS entity that instructs a UE Access Stratum ("AS") entity to discard an existing AS context and instructs the UE AS entity to modify an AS layer capability for the apparatus in response to entering the CM Idle state.

12. The apparatus of claim 11, wherein modifying the AS layer capability comprises disabling a UE capability for a particular radio access technology.

13. The apparatus of claim 11, wherein modifying the AS layer capability comprises enabling a UE capability for a particular radio access technology.

14. The apparatus of claim 11, wherein entering the CM Idle state comprises deactivating the AS context to enter a radio resource control ("RRC") idle state using NAS signaling and/or RRC signaling.

15. The apparatus of claim 1, wherein detecting the trigger to perform radio access capability update comprises detecting a need to change an Access Stratum ("AS") capability of the apparatus, wherein sending the request to the first communication system comprises requesting that the particular UE radio access capability be deprecated, wherein the RAN node does not consider the particular UE radio access capability.

16. The apparatus of claim 15, wherein requesting that the particular UE radio access capability be deprecated comprises sending one of a Non-Access Stratum "NAS" message or a radio resource control ("RRC") message to a core network.

17. The apparatus of claim 15, wherein requesting that the particular UE radio access capability be deprecated comprises indicating that a previously indicated RAT capability is deprecated.

18. The apparatus of claim 15, wherein requesting that the particular UE radio access capability be deprecated comprises indicating that a core network does not need to update the particular UE radio access capability.

19. The apparatus of claim 15, wherein detecting the need to change the AS capability of the apparatus comprises determining to register with a second communication system.

20. The apparatus of claim 15, wherein the processor further sends a request to the first communication system to abolish the deprecated UE radio access capability.

21. A method performed by a User Equipment ("UE"), the method comprising:
registering with a first communication system via a radio access network ("RAN") node using a first radio access technology ("RAT");
detecting a trigger to perform radio access capability update for at least one RAT used for communication with the first communication system, the trigger comprising one of: a determination that a second RAT is used in parallel with the first RAT, a determination that the second RAT is used not in parallel with the first RAT, or a determination to use a service not supported by the first communication system;
transitioning a UE state to an idle state;
establishing a new connection; and
sending a request to the first communication system, the request comprising a parameter that indicates that a particular User Equipment ("UE") radio access capability related to the first communication system is updated, the particular UE radio access capability being a capability to use a specific RAT, where the request comprises an indication to delete stored UE radio access capabilities in a network and retrieve UE radio access capabilities.

* * * * *